Dec. 18, 1962 W. F. NEWBOLD 3,069,655

SWITCHING SYSTEMS

Filed Dec. 11, 1957 2 Sheets-Sheet 1

INVENTOR.
WILLIAM F. NEWBOLD
BY Arthur H. Swanson
ATTORNEY.

INVENTOR.
WILLIAM F. NEWBOLD
BY Arthur H. Seidman
ATTORNEY.

3,069,655
Patented Dec. 18, 1962

3,069,655

SWITCHING SYSTEMS

William F. Newbold, Ambler, Pa., assignor to Minneapolis-Honeywell Regulator Company, Minneapolis, Minn., a corporation of Delaware Filed Dec. 11, 1957, Ser. No. 702,210
5 Claims. (Cl. 340—147)

This invention relates to electronic circuits, and more particularly to switching systems suitable for use in multiplex sampling of low-level signals.

It frequently has been found desirable to be able to switch between a plurality of low-level signals to apply samples of those signals to the input of a single instrumentality. This is particularly true in the field of instrumentation where it is often desirable to be able to multiplex the signals from a plurality of primary sensing elements, such as thermocouples, into the input of a signal recording, controlling or indicating instrument. These signals are most frequently direct current or voltage signals. Although these signals have been successfully switched by mechanical means, it is becoming increasingly important that switching means involving no mechanical movements be provided. Here, too, electronic switching means have been provided. However, these switching means include systems wherein the signal to be measured is passed through the switching tube. At the levels encountered in these circuits, considerable noise signals are introduced into the system and superimposed onto the data signals. To amplify the data signals prior to switching would require a separate amplifier for each of the channels being sampled. When there are a number of such channels being sampled, the expense of the separate amplifiers for each channel would be appreciable if not prohibitive.

It is, accordingly, an object of this invention to provide an improved switching system suitable for use with low-level signals.

It is another object of this invention to provide an improved multiplexing system for low-level signals wherein switching is accomplished without the use of movable mechanical members.

It is a further object of this invention to provide an improved switching system as set forth wherein electronic switching means are employed with the further provision that the data signals are not required to pass through an electronic switching tube.

In accomplishing these and other objects, there has been provided, in accordance with the present invention, magnetic converting means for each of the data signals being sampled. The output of all of these converting means is fed to the same amplifier. Each of the converters is provided with an excitation winding coupled to a source of excitation oscillations. An electronic switch is interposed, however, between the source of oscillations and each of said converting means. The electronic switching means is operated to apply the output of the source of oscillations sequentially to the converting means. Thus, the converting means are activated one at a time in sequence, and are operative to pass a data signal to the amplifier only when activated.

Figure 1:
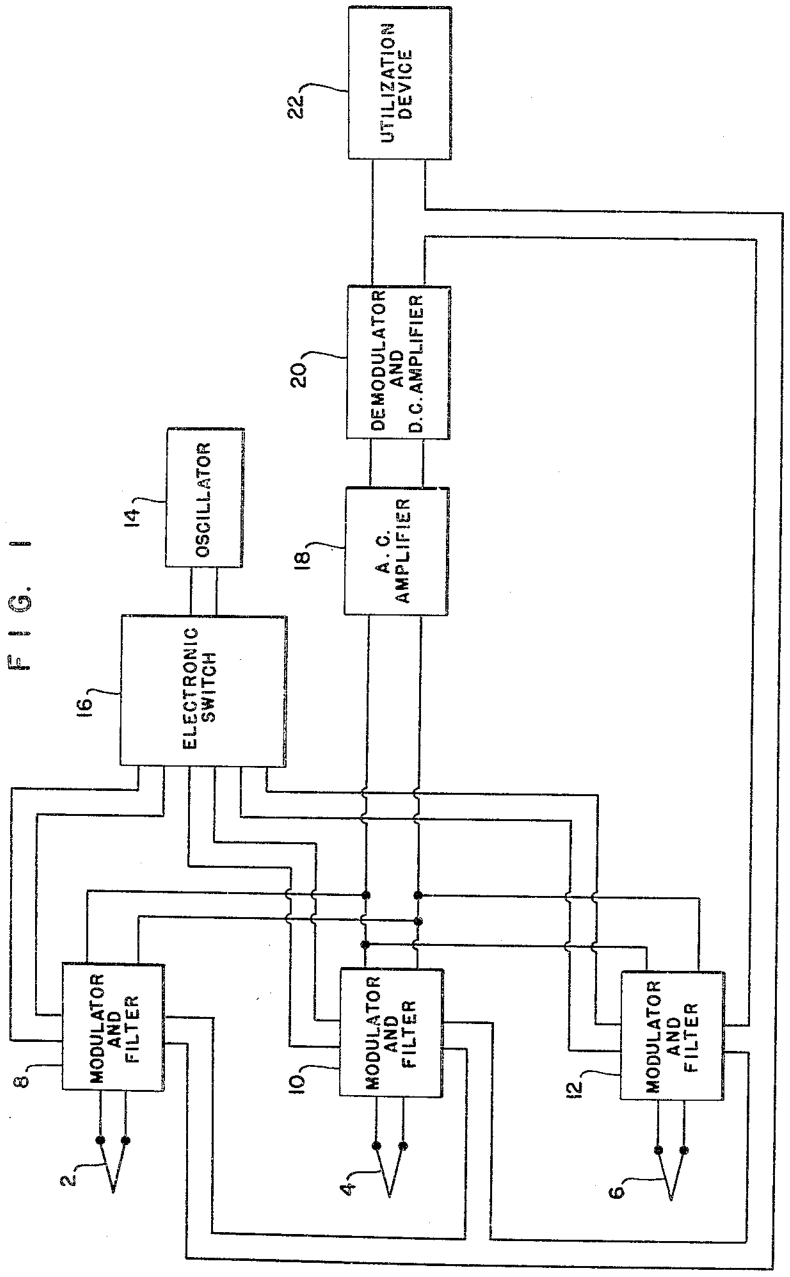
Figure 2:
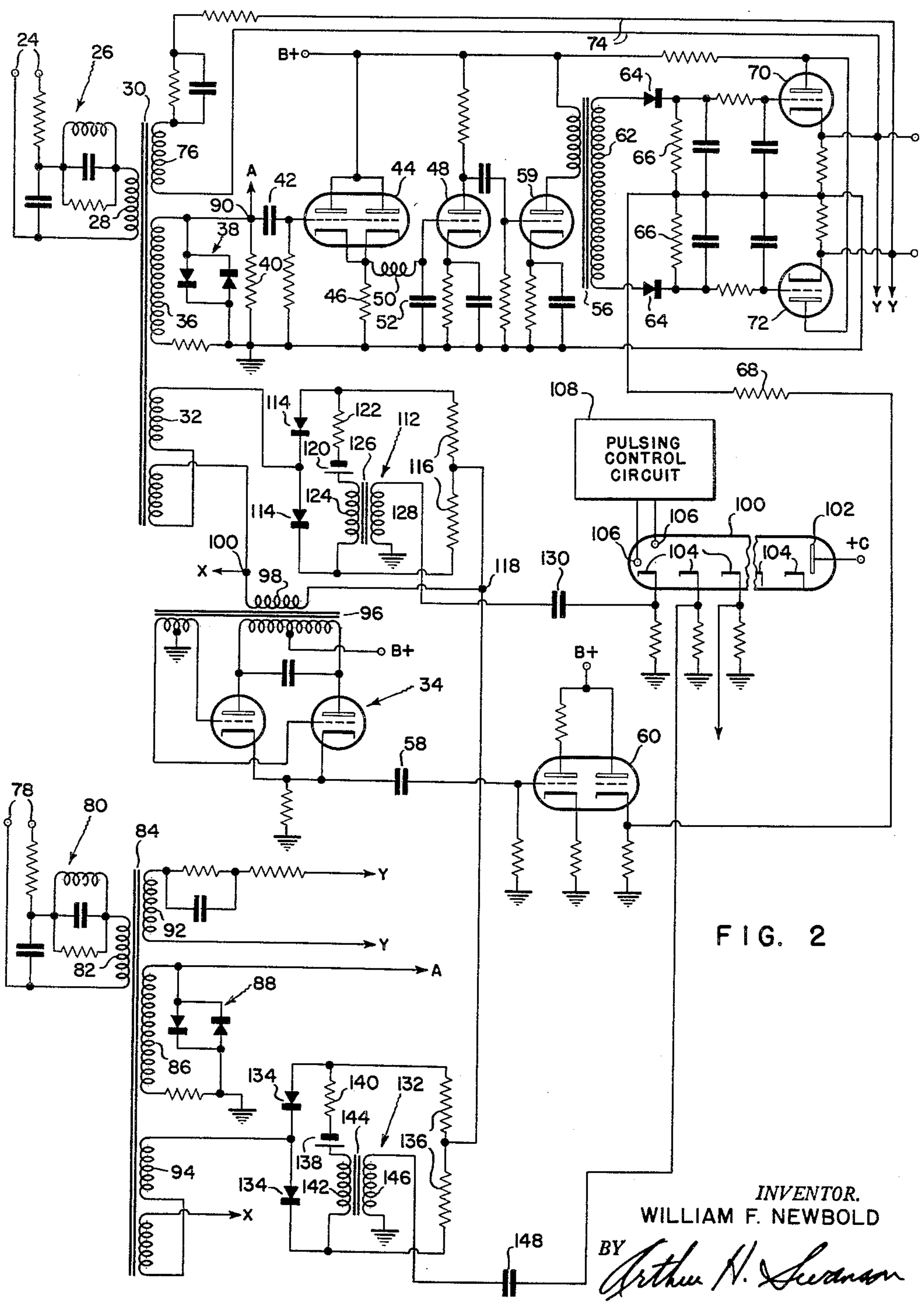

A better understanding of this invention may be had from the following detailed description when read in connection with the accompanying drawing, in which:

FIG. 1 is a schematic block diagram illustrating a signal sampling system embodying the present invention; and FIG. 2 is a schematic circuit diagram of a circuit embodying the present invention.

Referring now to the drawing in more detail, there is shown in FIG. 1 a multiplexing system which includes a plurality of primary sensing elements 2, 4 and 6 illustrated as thermocouples. Each of the thermocouples is connected to a corresponding magnetic modulator or converter and filter circuit 8, 10 and 12, respectively. These magnetic modulator circuits may include magnetic modulators similar to those shown in the copending application of William A. Rote, Serial No. 470,097, filed November 19, 1954, now Patent No. 2,882,352, and will be more fully explained hereinbelow. An oscillator 14 constitutes a source of excitation oscillations for the magnetic modulators. This oscillator 14 is connected to the input of an electronic switching circuit 16. The switch circuit is arranged to apply oscillatory energy, in sequence, to the several modulators. The modulators are characterized in that the D.C. input signals are converted into corresponding alternating signals the amplitude and phase of which vary in accordance with magnitude and direction of change in the input signal. The modulators are effective to produce no corresponding output signal unless the modulator to which the input signal is applied has the oscillatory excitation simultaneously applied thereto. Therefore, the switching of the oscillatory energy from one to another of the modulators effectively activates the modulators, in sequence, to pass signals applied to the input terminals thereof through to a common A.C. amplifier 18.

The output of the amplifier 18 is fed to a demodulator and D.C. amplifier circuit 20. The demodulator may take the form of a synchronous rectifier. The demodulated and amplified signal is then applied to a utilization device 22 which, as previously mentioned may be a controlling, recording, or indicating device. The demodulated and amplified signal is also applied as negative feedback to the several modulators. This feedback connection provides the usual D.C. stabilization for the D.C. amplification of the particular channel which is momentarily activated through the operation of the electronic switch. Although the same feedback connection is made simultaneously to all the modulators, it is of significance only in that channel activated at the time.

In FIG. 2 there is shown a circuit diagram illustrating circuit elements which may be used in the present invention as illustrated in the block diagram of FIG. 1. For purposes of simplicity of explanation, only two input channels are shown. However, since each of the input channels is identical to the two illustrated, the showing of additional channels is felt to be unnecessary for this description. The D.C. signal input may be connected to the input circuit terminals 24 and fed through a filter 26 to the input winding 28 of the first magnetic modulator 30. The characteristic operation of the modulator 30 is such that the output signal thereof will be of a frequency which is the second harmonic of the frequency of the exciting current. The filter 26 in the input circuit is tuned to this second harmonic frequency to prevent this signal from being reflected into the circuit of the primary sensing element connected to the terminals 24. The magnetic modulator 30 is provided with an exciting winding 32 which is energized with exciting current from an oscillator 34 as will be more fully set forth hereinbelow. The magnetic modulator is also provided with an output winding 36 which is connected with the input of an A.C. amplifier. A filter 38 is included in the output circuit to provide a measure of isolation to prevent the interaction of the several channels.

The output signal voltage is developed across a load resistor 40. This voltage is capacitively coupled through a capacitor 42 to the control grid of a first stage amplifier 44. This first stage is provided with a cathode follower output taken across the cathode resistor 46 and applied to the grid of the next amplifier stage 48. The input to the amplifier 48 includes a tuned circuit consisting of an inductance coil 50 and a capacitor 52 which is arranged for the rejection of signals other than the aforementioned second harmonic of the excitation current. The output of the amplifier 48 is capacitively coupled to the input of a power amplifier 59. A synchronous demodulator circuit is coupled to the output of the power stage 54 through a transformer 56.

A reference signal is obtained from the oscillator 34 for the synchronous operation of the demodulator. This signal is taken from the cathode circuit of the push-pull oscillator and constitutes a second harmonic of the fundamental frequency of the oscillator. This signal is applied through a coupling capacitor 58 to the input of a two stage amplifier 60. The demodulator includes the secondary winding 62 of the transformer 56, a pair of diode rectifiers 64 and a pair of resistors 66. The reference signal from the amplifier 60 is applied through a load resistor 68 to the junction between the two resistors 66. The output of this demodulator is a D.C. signal, the polarity magnitude of which is dependent upon the input signal applied to the magnetic modulator. This demodulated signal is applied in push-pull fashion to the input of a pair of output D.C. amplifiers 70 and 72 the output of which is applied to whatever utilization device is required. The output of the D.C. amplifier is also coupled through a pair of leads 74 to the feedback winding 76 on the magnetic modulator 30 to stabilize the operation of the circuit in the usual manner of negative feedback applications.

For purposes of illustration, a second input channel is shown. This comprises a second pair of input terminals 78 feeding through a filter 80 to the input winding 82 of a second magnetic modulator 84. The modulator 84 is also provided with an output winding 86 which is coupled through an isolating filter 88 in the same manner as the isolating filter 38 shown in the first magnetic modulator circuit. The signal from the output winding 86 is connected to the hereinbefore described A.C. amplifier at the junction 90 as represented by the lead arrow A. Thus, the second modulator, when activated, also develops a signal across the resistor 40 which is applied to the input of the amplifier stage 44. This modulator also is provided with a feedback winding 92 which is coupled to the demodulated output of the amplifier as indicated by the lead arrows Y—Y. The second modulator is provided with an exciting winding 94 which is energized from the oscillator 34.

The oscillator 34 includes a transformer 96, the secondary 98 of which is connected to means constituting an electronic sequence switch. The electronic sequence switch includes an electronic counting tube 100 which is of the type having a single anode 102 and a plurality, say, for example, ten, cathodes 104 and a plurality of pairs of control electrodes 106. These tubes are characterized in that a conductive path may be established between the anode 102 and any selected one of the plurality of cathodes 104. When properly controlled, the tube may be activated to cause the conductive path to proceed sequentially, on a predetermined time base, from one cathode to the next. Such a control may be exercised by pulsing in sequence the control electrodes 106. To accomplish this pulsing, there is provided a pulsing control circuit 108 coupled to these electrodes. This pulsing control circuit 108 may comprise, suitably, a monostable multivibrator.

Referring back to the modulator 30, it may be seen that the exciting winding 32 has one terminal end thereof connected directly to one end of the oscillator transformer secondary 98 at the junction 110. The other terminal of the winding 32 is connected to a bridge network 112 which functions as an energy interrupter. The bridge network includes a pair of diodes 114 serially connected. The junction between these diodes constitutes the output terminal to which the exciting winding 32 is connected. These two diodes constitute two adjacent legs of the bridge network. The other two legs of the bridge comprise a pair of resistors 116. The junction between these two resistors is connected to the other end of the oscillator transformer secondary 98 by way of the junction 118. Connected across the bridge 112, there is connected a source of bias potential represented by the battery 120. This bias source is serially connected with a resistor 122 and the secondary 124 of a triggering transformer 126. The voltage derived from the bias source 120 is of a magnitude sufficient to back-bias the two diodes to block the application of the oscillatory energy from the transformer winding 98 to the exciting winding 32. It effectively constitutes a high impedance block in the circuit. To trigger this circuit to permit the application of the oscillatory energy to the winding 32, the transformer 126 has a primary winding 128 which is connected through a coupling capacitor 130 to the first cathode 104 of the counting tube 100. This connection constitutes a cathode follower which applies a positive signal across the capacitor 130 to the primary 128 of the transformer 126. This positive pulse is applied to the secondary 124 in a direction to oppose the bias source 120, unblocking the bridge circuit and permitting the application of the oscillatory energy from the transformer winding 98 to the exciting winding 32. Thus, when the conductive path in the tube 100 is established between the anode 102 and the first cathode 104, the oscillatory energy from the winding 98 is applied through the bridge 112 to the exciting winding 32, thereby activating the first modulator 30.

In a similar manner, the exciting winding 94 on the second illustrated modulator 84 has one terminal thereof also connected to the secondary winding 98 of the oscillator 34 at the junction 110 as represented by the arrows designated X. The other terminal of the exciting winding 94 is connected through bridge circuit to the other end of the secondary 98 at the junction 118 through its bridge circuit 132. The bridge circuit 132 is identical in arrangement and function to the bridge circuit 112. It includes a pair of diodes 134 constituting two legs of the bridge and a pair of resistors 136 constituting the other two legs of the bridge. A source of bias voltage 138 is connected through a resistor 140 and a secondary winding 142 of a triggering transformer 144 to the alternate corners of the bridge. The transformer 144 has a primary 146 which is connected through a coupling capacitor 148 to the second cathode 104 of the tube 100. Other modulators, and, therefore, other input circuits may be similarly connected. Each of the modulators will, of course, be arranged for actuation through connections to separate ones of the several cathodes in the counting tube 100. Since the conductive path may be established in the tube 100 between the anode 102 and only one of the cathodes 104, only the particular modulator which is keyed into operation by the energization of the particular cathode in the tube 100 will be operative at any one time to apply signals to the junction 90, hence to the input of the amplifier.

Thus, it may be seen that there has been provided, in accordance with the present invention, an improved switching system suitable for use with low-level signals, which accomplishes the switching without the employment of movable mechanical elements, and which is characterized in that the signals are applied to separate magnetic modulators which are individually and selectively actuated by the selective application of exciting current thereto.

What is claimed is:

1. An electronic switching system for low-level signals comprising a plurality of signal input circuits, a magnetic modulator means coupled to each of said input circuits for modulating input signals in accordance with a modulator excitation signal, a source of modulator excitations signals, means providing a coupling path between said source and each of said modulating means, control means in each of said paths, biasing means for normally biasing said control means to block the passage of excitation signals in said paths, an electronic counting tube connected in circuit and operable to selectively and sequentially modify the bias condition on said control means to sequentially unblock corresponding ones of said paths, and an output amplifier coupled to all of the said modulator means.

2. An electronic switching system for low-level signals comprising a plurality of signal input circuits, a magnetic modulator means coupled to each of said input circuits for modulating input signals in accordance with a modulator excitation signal, a source of modulator excitation signals, means providing a coupling path between said source and each of said modulator means, control means in each of said paths, means for normally biasing said control means to block the passage of excitation signals in said paths, an electronic counting tube having an anode and a plurality of cathodes, means for energizing said counting tube to establish a conductive path between said anode and one of said cathodes, means for shifting said conductive path sequentially from cathode to cathode, each of said control means being coupled to the cathode circuit of a separate one of said cathodes of said counting tube whereby to modify the bias condition on said control means selectively and sequentially in accordance with the position of said conductive path in said counting tube to unblock corresponding ones of said paths, and an output amplifier coupled to all of said modulator means.

3. An electronic switching system for low-level signals comprising a plurality of signal input circuits, a magnetic modulator means coupled to each of said input circuits for modulating input signals in accordance with a modulator excitation signal, an oscillator providing a source of modulator excitation signals, means providing a coupling path between said oscillator and each of said modulator means, control means in each of said paths including a bridge means having a pair of diodes therein, means for normally biasing said diodes to block passage of excitation signals in said paths, electronic means for selectively and sequentially modifying the bias condition on said diodes to unblock corresponding ones of said paths, and an output amplifier coupled to all of said modulator means.

4. An electronic switching system for low-level signals comprising a plurality of signal input circuits, a magnetic modulator means coupled to each of said input circuits for modulating input signals in accordance with a modulator excitation signal, an oscillator providing a source of modulator excitation signals, means providing a coupling path between said oscillator and each of said modulator means, control means in each of said paths including a bridge means having a pair of diodes therein, means for normally biasing said diodes to block the passage of excitation signals in said paths, an electronic counting tube connected in circuit and operable to selectively and sequentially modify the bias condition on said diodes to unblock corresponding ones of said paths, and an output amplifier coupled to all of said modulator means.

5. An electronic switching system for low-level signals comprising a plurality of signal input circuits, a magnetic modulator means coupled to each of said input circuits for modulating input signals in accordance with a modulator excitation signal, an oscillator providing a source of modulator excitation signals, means providing a coupling path between said oscillator and each of said modulator means, control means in each of said paths including a bridge means having a pair of diodes therein, means for normally biasing said diodes to block the passage of excitation signals in said paths, an electronic counting tube having an anode and a plurality of cathodes, means for energizing said counting tube to establish a conductive path between said anode and one of said cathodes, means for shifting said conductive path sequentially from cathode to cathode, each of said bridge means being coupled to the cathode circuit of a separate one of said cathodes of said counting tube whereby to modify the bias condition on said diodes selectively and sequentially in accordance with the position of said conductive path in said counting tube to unblock corresponding ones of said paths, and an output amplifier coupled to all of said modulator means.

References Cited in the file of this patent

UNITED STATES PATENTS

| | | |
|---|---|---|
| 2,454,792 | Grieg | Nov. 30, 1948 |
| 2,644,933 | Peterson | July 7, 1953 |
| 2,701,354 | Bennett | Feb. 1, 1955 |
| 2,850,725 | Beaumont | Sept. 2, 1958 |
| 2,910,682 | Leonard | Oct. 27, 1959 |